United States Patent
Bostick et al.

(10) Patent No.: US 9,727,741 B2
(45) Date of Patent: *Aug. 8, 2017

(54) CONFIDENTIAL CONTENT DISPLAY IN FLEXIBLE DISPLAY DEVICES

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/538,438

(22) Filed: Nov. 11, 2014

(65) Prior Publication Data

US 2016/0132683 A1    May 12, 2016

(51) Int. Cl.
*G06F 21/60* (2013.01)
*G06F 21/62* (2013.01)
(Continued)

(52) U.S. Cl.
CPC .............. *G06F 21/60* (2013.01); *G06F 3/013* (2013.01); *G06F 3/0412* (2013.01); *G06F 3/0487* (2013.01); *G06F 3/147* (2013.01); *G06F 21/6245* (2013.01); *G06F 21/6254* (2013.01); *G06F 21/84* (2013.01); *G06K 9/00288* (2013.01); *H04N 5/225* (2013.01); *H04N 5/2251* (2013.01); *G06F 1/1652* (2013.01); *G06F 2203/04102* (2013.01);
(Continued)

(58) Field of Classification Search
CPC ...... G06F 21/60; G06F 3/013; G06F 21/6245; G06K 9/00288; G09G 5/003; G09G 2380/02
See application file for complete search history.

(56) References Cited

U.S. PATENT DOCUMENTS 5,903,646 A    5/1999  Rackman
8,462,949 B2   6/2013  Anderson et al.
(Continued)

FOREIGN PATENT DOCUMENTS

WO    2010057683 A1    5/2010
WO    2014003924 A1    1/2014

OTHER PUBLICATIONS

"EasyMeasure—Measure with your Cameral on the App Store on iTunes", https://itunes.apple.com/us/app/easymeasure-measure-your-camera!/id349530105?mt=8; at least as early as Mar. 2012.

*Primary Examiner* — Oleg Korsak
(74) *Attorney, Agent, or Firm* — Brown & Michaels, PC; John R. Pivnichny (57) ABSTRACT

Confidential content within a file is masked for display on a flexible display device. A legend relating the masking to the confidential content is displayed in a hidden area created by bending the flexible display device. The flexible display device monitors secondary users and their gaze towards the flexible display device and the hidden area to determine if unauthorized secondary users can see the display and hidden area of the flexible display device.

20 Claims, 7 Drawing Sheets

(51) Int. Cl.
*G06F 3/01* (2006.01)
*G06K 9/00* (2006.01)
*G06F 3/041* (2006.01)
*H04N 5/225* (2006.01)
*G06F 3/147* (2006.01)
*G06F 3/0487* (2013.01)
*G06F 21/84* (2013.01)
*G06F 1/16* (2006.01)

(52) U.S. Cl.
CPC . *G09G 2340/0464* (2013.01); *G09G 2354/00* (2013.01); *G09G 2358/00* (2013.01); *G09G 2380/02* (2013.01)

(56) References Cited

U.S. PATENT DOCUMENTS

| | | | |
|---|---|---|---|
| 2006/0016884 A1* | 1/2006 | Block | G06K 19/08 235/381 |
| 2009/0141895 A1* | 6/2009 | Anderson | G06F 21/84 380/252 |
| 2010/0205667 A1 | 8/2010 | Anderson et al. | |
| 2011/0065479 A1 | 3/2011 | Nader | |
| 2011/0296308 A1 | 12/2011 | Yi | |
| 2012/0081392 A1 | 4/2012 | Arthur | |
| 2013/0265221 A1 | 10/2013 | Lee et al. | |
| 2014/0013437 A1 | 1/2014 | Anderson et al. | |
| 2015/0150140 A1* | 5/2015 | Biswas | G06F 21/60 726/26 |

* cited by examiner

NO HIDDEN AREA

Fig. 3b

LESS HIDDEN AREA

Fig. 3c

MORE HIDDEN AREA

Fig. 3d

MOST HIDDEN AREA

CONFIDENTIAL CONTENT DISPLAY IN FLEXIBLE DISPLAY DEVICES

BACKGROUND

The present invention relates to flexible display devices, and more specifically to confidential content display in flexible display devices.

Often, users are looking at confidential content within an electronic file while in a public place or a place containing other users which are unauthorized to see the confidential content. Confidential content can be shared through e-mail, documents, social media and the like. The confidential content may include salary information, credit card number, phone number, personal identification information, or other information. Once a user opens a document with confidential content in a public area, there is a risk that other unauthorized users can see the confidential content.

For example, while at a coffee shop a user may open a confidential presentation on their electronic device. In this scenario, there are likely unauthorized users nearby that may casually look at the content without malicious intent, however there may also be other unauthorized users that are intentionally looking to take advantage of the user to steal the confidential information or someone's identity from the presentation materials displayed on the electronic device.

SUMMARY

According to one embodiment of the present invention, a method of displaying confidential content on a flexible display of a flexible display device having a plurality of sensors for sensing bending of the flexible display device, at least one camera, and a computer coupled to the plurality of sensors and the at least one camera. The method comprising the steps of: the computer receiving content for display on the flexible display device for a user comprising confidential content and non-confidential content; the computer determining that at least one secondary user is present by searching through the at least one camera of the flexible display device for the viewing direction of the secondary user and unauthorized to view at least a portion of the confidential content; the computer determining locations of the confidential content present within the file; the computer masking the confidential content locations based on a classification of the confidential content and authorization of the user; the computer calculating coordinates at which to bend the flexible display device to create a hidden area to display confidential content to the user; the computer directing a bend of the display at the coordinates; after the display is bent, the computer determining an actual area hidden by the bending of the flexible display; and the computer displaying the confidential content within the hidden area of the bent flexible display device out of view of the at least one secondary user.

According to another embodiment of the present invention, a computer program product for displaying confidential content on a flexible display of a flexible display device having a plurality of sensors for sensing bending of the flexible display device, at least one camera, and a computer. The computer comprising at least one processor, one or more memories, one or more computer readable storage media, coupled to the plurality of sensors and the at least one camera, the computer program product comprising a computer readable storage medium having program instructions embodied therewith, the program instructions executable by the computer to perform a method. The method comprising: A computer program product for displaying confidential content on a flexible display of a flexible display device having a plurality of sensors for sensing bending of the flexible display device, at least one camera, and a computer comprising at least one processor, one or more memories, one or more computer readable storage media, coupled to the plurality of sensors and the at least one camera, the computer program product comprising a computer readable storage medium having program instructions embodied therewith, the program instructions executable by the computer to perform a method comprising: receiving, by the computer, content for display on the flexible display device for a user comprising confidential content and non-confidential content; determining, by the computer, that at least one secondary user is present by searching through the at least one camera of the flexible display device for the viewing direction of the secondary user and unauthorized to view at least a portion of the confidential content; determining, by the computer, locations of the confidential content present within the file; masking, by the computer, the confidential content locations based on a classification of the confidential content and authorization of the user; calculating, by the computer, coordinates at which to bend the flexible display device to create a hidden area to display confidential content to the user; directing, by the computer, a bend of the display at the coordinates; after the display is bent, determining, by the computer, an actual area hidden by the bending of the flexible display; and displaying, by the computer, the confidential content within the hidden area of the bent flexible display device out of view of the at least one secondary user.

According to another embodiment of the present invention, a method of displaying confidential content on a flexible display of a flexible display device having a plurality of sensors for sensing bending of the flexible display device, at least one camera, and a computer coupled to the plurality of sensors and the at least one camera. The method comprising the steps of: the computer receiving content for display on the flexible display device for a first user; the computer determining by the at least one camera a second user present in the field of view of the device; and if the content for display contains confidential content and a second user is present within the field of view of the device who is unauthorized to view the confidential content, the computer performing the steps of: calculating coordinates at which to bend the flexible display device to create a hidden area to display confidential content to the user directing a bend of the display at the coordinates; and formatting for display, the received content into a non-confidential display portion with confidential content masked and a confidential display portion in the hidden area.

DETAILED DESCRIPTION

Figure 1:
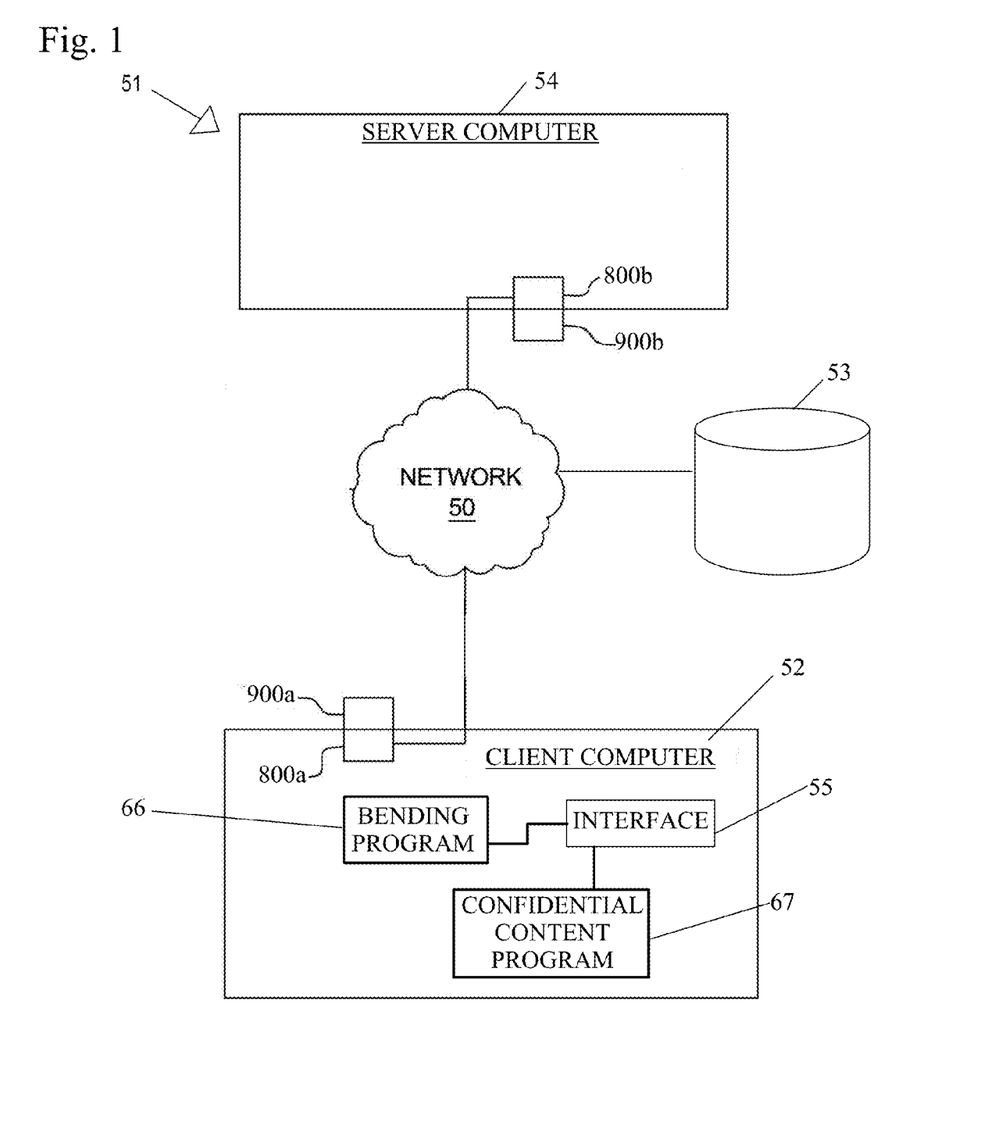
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

Figure 6:
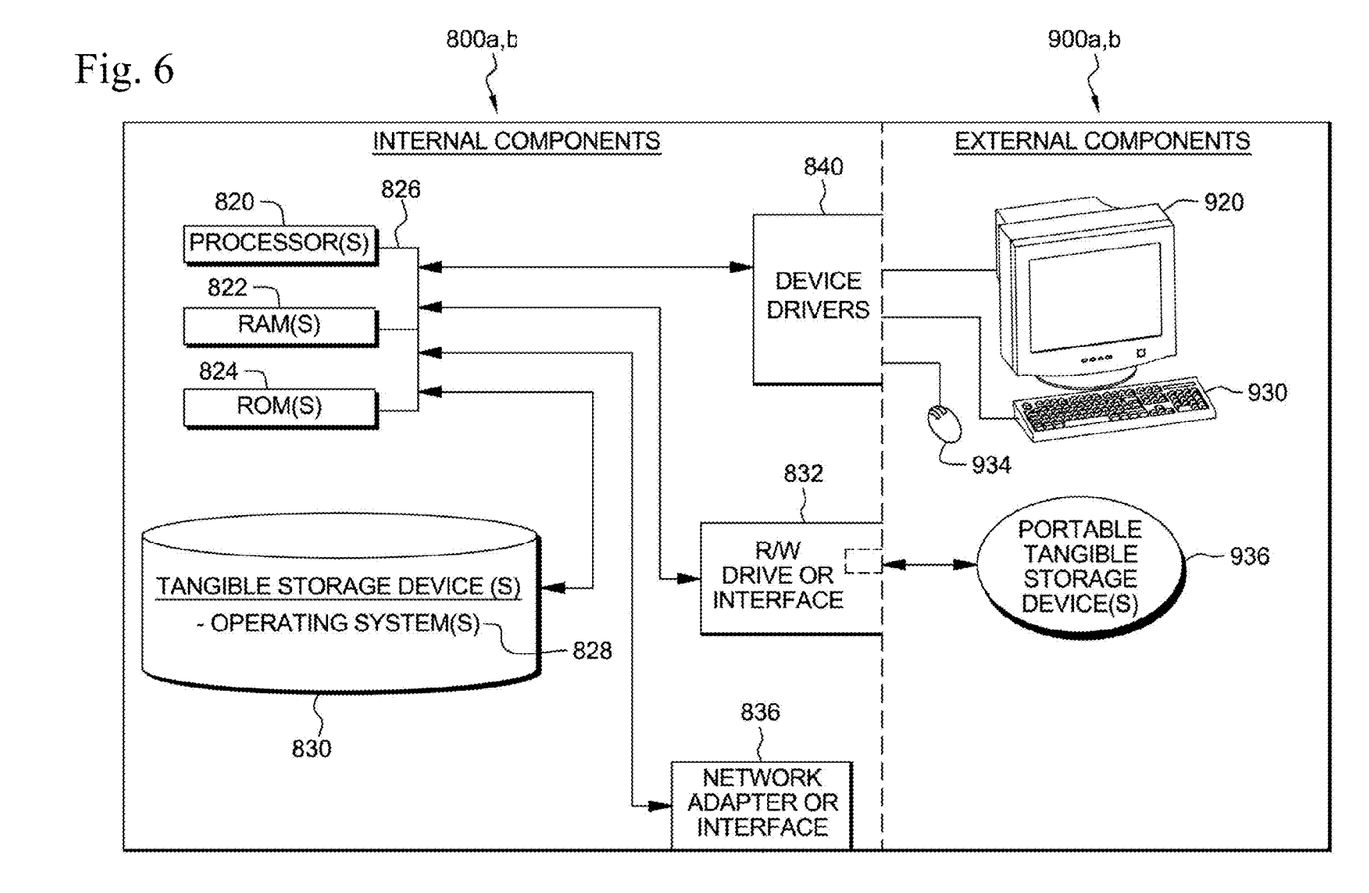
FIG. 6 illustrates internal and external components of a client or device computer and a server computer in which illustrative embodiments may be implemented.

Device computer 52 includes a set of internal components 800a and a set of external components 900a, further illustrated in FIG. 6. Device computer 52 may be, for example, a mobile device, a cell phone, a personal digital assistant, a netbook, a laptop computer, a tablet computer, a desktop computer, or any other type of computing device with a flexible display.

Device computer 52 may contain an interface 55. The interface 55 may accept commands and data entry from a user. The interface 55 can be, for example, a command line interface, a graphical user interface (GUI), or a web user interface (WUI), tactile interface with pressure sensitivity. The device computer 52 preferably includes a bending program 66 and a confidential content program 67. While not shown, it may be desirable to have the bending program 66 and the confidential content program 67 be present on the server computer 54.

Server computer 54 includes a set of internal components 800b and a set of external components 900b illustrated in FIG. 6.

In the depicted example, server computer 54 provides information, such as boot files, operating system images, and applications to device computer 52. Server computer 54 can compute the information locally or extract the information from other computers on network 50.

Program code and programs such as a bending program 66 and a confidential content program 67 may be stored on at least one of one or more computer-readable tangible storage devices 830 shown in FIG. 6, on at least one of one or more portable computer-readable tangible storage devices 936 as shown in FIG. 6, on repository 53 connected to network 50, or downloaded to a data processing system or other device for use. For example, program code and programs such as a bending program 66 and a confidential content program 67 may be stored on at least one of one or more tangible storage devices 830 on server computer 54 and downloaded to the device computer 52. Alternatively, server computer 54 can be a web server, and the program code and programs such as a bending program 66 and a confidential content program 67 may be stored on at least one of the one or more tangible storage devices 830 on server computer 54 and accessed on the device computer 52. Bending program 66 and confidential content program 67 can be accessed on device computer 52 through interface 55. In other exemplary embodiments, the program code and programs such as a bending program 66 and a confidential content program 67 may be stored on at least one of one or more computer-readable tangible storage devices 830 on server computer 54 or distributed between two or more servers.

Referring to FIGS. 2a-2d and 3a-3d, a flexible display 102 is a display device which is flexible in nature, includes a plurality of sensors (not shown) that can sense the bending direction of the display relative to axes of the display, the degree of bending of the display (bending stress imparted to the display) and touch or pressure from a user. The flexible display 102 also preferably contains at least one camera 104 on the display. The camera 104 can preferably track facial direction of users who are in a specific range and viewing angle of the flexible display 102. The display area 103 of the flexible display device 102 preferably has a grid (not shown) corresponding to a series of coordinates which can be used to indicate where the flexible display device will bend or should be bent by the user.

The camera 104 tracks the presence of other users in a continuous fashion for facial recognition and to determine whether other unauthorized users may be in a position to view the confidential content on the flexible display device. Users are granted viewing access to the display area 103 based on their facial image. If a user's facial image is verified through comparison to facial images stored in a repository, for example repository 53, and associated with the authorized user who opened the file, the user is granted access to view the confidential content on the flexible display device.

When a file with confidential content is opened, the rights of who can see the display of the confidential content are determined as well as the degree of confidential content. This includes levels of confidential and percentage of content that is confidential. The determination of what confidential content is present in the file may be predetermined by the creator of the file, present within properties of the file, defined by the user, or may be extracted by a text mining algorithm from text within the file.

If anyone other than authorized users is within viewing range to see the display, then the confidential contents will be masked automatically, for example using different colors, hatching or something indicating different levels of confidentiality.

The bending program 66 and/or the confidential content program 67 of the flexible display device 102 will calculate and show the bend direction and amount of bend required to hide a particular display portion (referred to as the hidden area or confidentiality pane) from any users who are unauthorized and in viewing range of the display. As the authorized user needs more space in a confidential pane or hidden area 115, the bending of the display 102 increases to fit the legend associated with identifying the confidential content masked in the display portion 116 of the display area 103.

If the unauthorized users are so close or within a specific range of the display device 102 and there is no viewing angle that can protect the confidential content from viewing by unauthorized users, the authorized user will be alerted and the document will not be displayed to the authorized user.

Figures 2A, 2B:
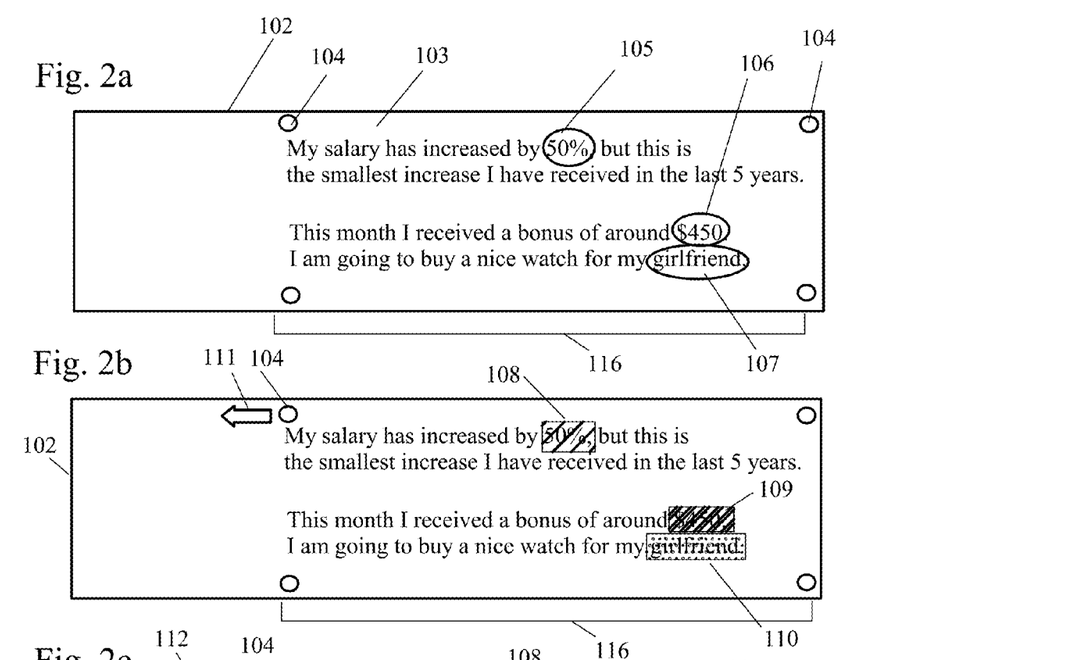
FIGS. 2a-2d show schematics of an electronic flexible display device with confidential content and classification of the confidential content.

FIG. 2a shows an example of a portion of a flexible display device 102 displaying an electronic file in which multiple pieces of confidential content 105, 106, 107 are present. The confidential content program 67 may detect the confidential content 105, 106, 107 within the file prior to opening or the confidential content of the file may be established prior to the user opening the file.

In this example, the confidential content 105, 106, 107 is circled, e.g. 50%, $450, and girlfriend. The confidential content 105, 106, 107 may be ranked or classified by how confidential a user feels the content is or a predefined classification set of confidentiality. In this case, the 50% 105 and $450 106 would be classified as being more confidential than "girlfriend" 107. The confidential content of 50% and $450 could be ranked at the same confidential level or at different levels.

FIG. 2b depicts the confidential contents 105, 106, 107 being masked with different colors, which are indicated by different shading 108, 109, 110. Different colors or hatching or some other distinguishing markings are used based on the extent or degree of confidentiality. The confidential content of 50% is indicated by diagonal single lines 108, the confidential content of $450 is indicated by double diagonal lines 109 and the confidential content of girlfriend is marked with dots 110 within the display portion 116. The flexible display device 102 also displays an indication 111 of where the flexible display device should be bent to hide the confidential content 105, 106, from unauthorized users. The indication 111 is preferably displayed graphically to the authorized user. The direction of the bend of the flexible display is based on the location of unauthorized users from the facial recognition. The amount of the flexible display device 102 that is bent may be also be correlated to the degree of confidentiality associated with the confidential content. The higher the degree of confidentiality and the amount of confidential content, the larger the hidden area 115 should be.

Figure 3A:
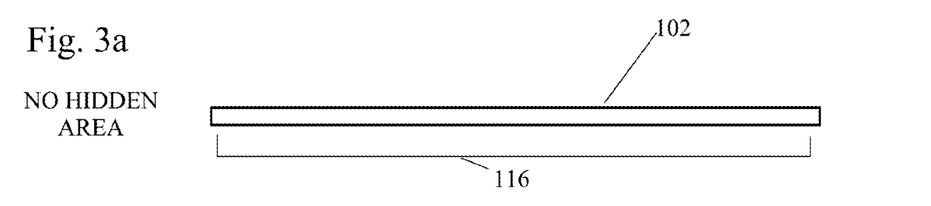
FIGS. 3a-3d show a schematic of degrees of bending a portion of the flexible display device to hide confidential content from unauthorized users.
Figure 3B:
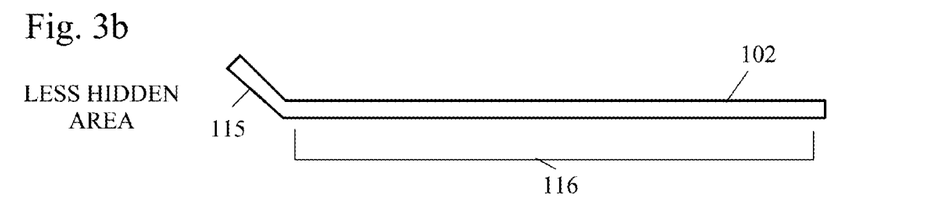
Figure 3C:
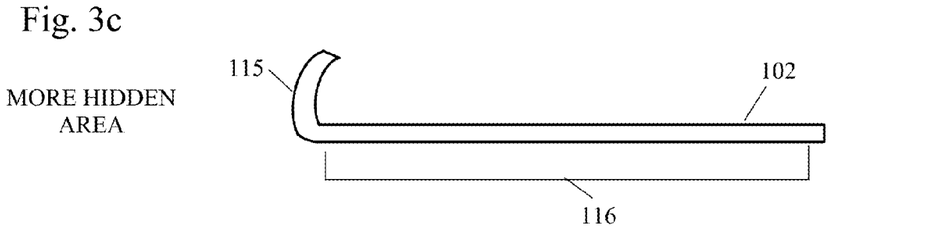
Figure 3D:
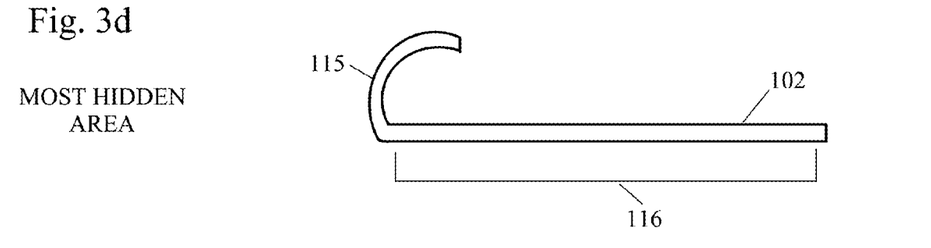

FIG. 3a shows a side view of a flexible display device 102 in which the entire display portion 116 of the flexible display is present and no area of the flexible display is hidden. FIGS. 3b-3d shows various degrees of bending of the flexible display device to provide hidden areas 115 of various sizes for displaying the legend of confidential content corresponding to the masked confidential content present in the display portion 116 of the flexible display device.

A bending sensor (not shown) of the flexible display device detects when and where the flexible display device is bent and detects a hidden area 115. The confidential content is displayed in the hidden area 115 with matching color coding or an appropriate legend 113 and the exposed portion or display portion 116 of the flexible display displays the entire contents of the file with the confidential content masked.

Figures 2C, 2D:
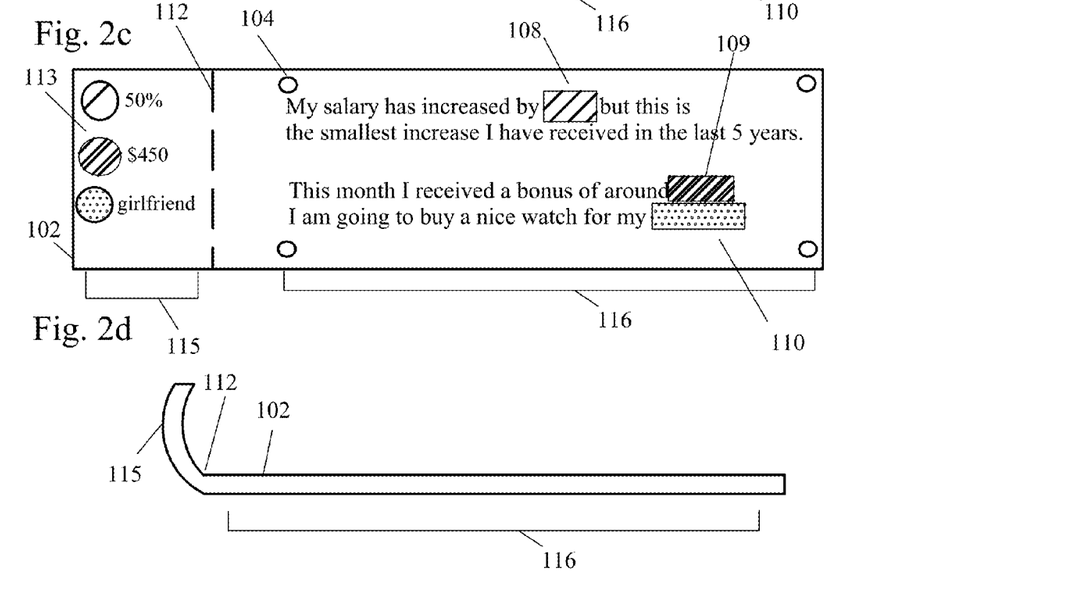

FIG. 2c shows a legend 113 displayed in a margin or portion of a hidden area 115 of the flexible display area 103 corresponding to the confidential content displayed for viewing to both an authorized and unauthorized users. The confidential content may be displayed in a smaller font or type than present in the electronic file to further prohibit unauthorized users from seeing the confidential content. The bend of the flexible display is indicated by the dashed line 112. FIG. 2d shows a side view of the bent flexible display of FIG. 2c.

Figure 4:
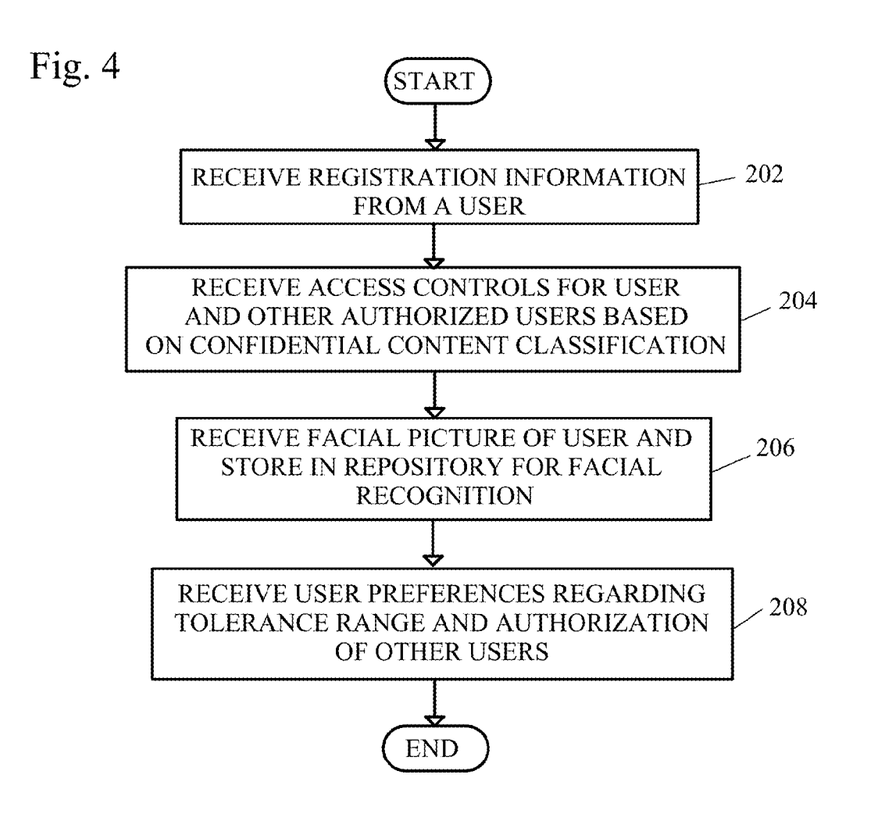
FIG. 4 shows a flow diagram of a method of registering a user and confidential content authorization of additional users.

FIG. 4 shows a flowchart of a method of registering a user and confidential content authorization of additional users.

In a first step, a confidential content program 67 of the flexible display device receives registration information from a user (step 202). The registration information may include, but is not limited to personal information, such as name, address, phone number, date of birth, and other information that can be used to verify the identity of the user.

The confidential content program 67 of the flexible display device receives a confidential content classification from the user (step 204). There are many potential levels of confidential content classification defined such as top secret, secret, confidential, non-confidential, or a numeric security level could be used. These levels may be predefined and/or altered based on user preferences. A user may consider any information having to do with salary to be at the top level of confidential content classification, where his address is at a lesser level of classification. There may be other users that would rank their address at a higher level of classification than information associated with their salary.

Within a given document, specific sections could have different classifications providing the ability for the user to control access to who can read different classifications of the confidential content. The registering or authorized user may grant specific secondary authorized users access to certain levels of confidential content based on classification.

The confidential content program 67 of the flexible display device receives a facial picture of the registering or authorized user and any secondary users and stores the facial picture with the user's registration information (step 206), for example in repository 53 of FIG. 1. The facial picture in combination with the registration information may be used to validate viewing of confidential content within electronic files.

The confidential content program 67 of the flexible display device receives user preferences (step 208), which may include, but is not limited to tolerance range, allowance for other authorized viewers, whether the device bends automatically or provides a recommendation for the user to bend the flexible display device.

The tolerance range would include a range of distance from the display in which a user does not want unauthorized users present even with bending of the flexible display device to hide confidential content, and a range in which to search for possible unauthorized users attempting to view the display of the flexible display device.

A registered or authorized user may also register or authorize a plurality of secondary users to view at least a portion of confidential content, for example spouses or other family members or members of the same workgroup.

Figure 5A:
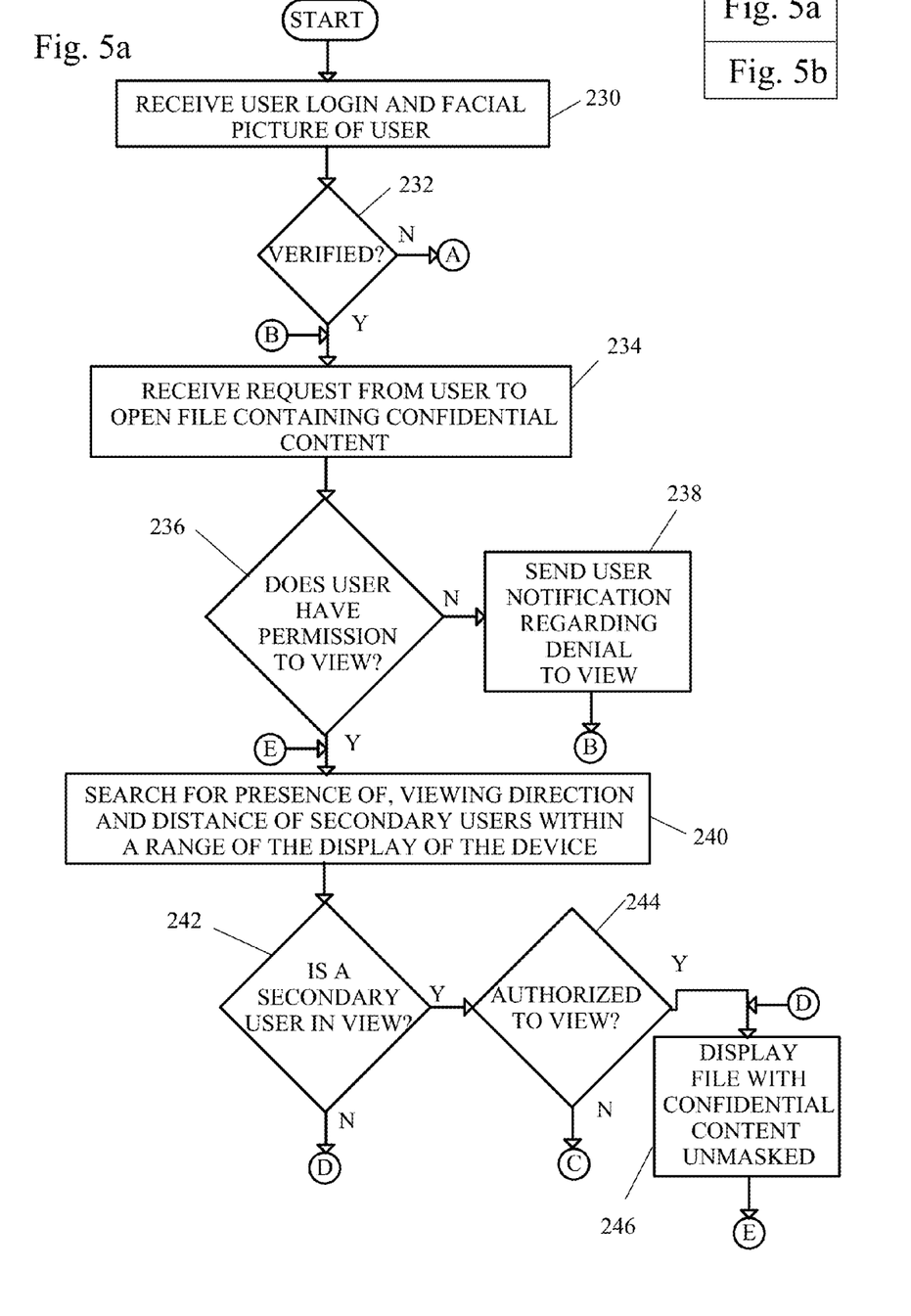
FIG. 5a-5b shows a flow diagram of a method of displaying confidential content on a flexible display for authorized users.
Figure 5B:
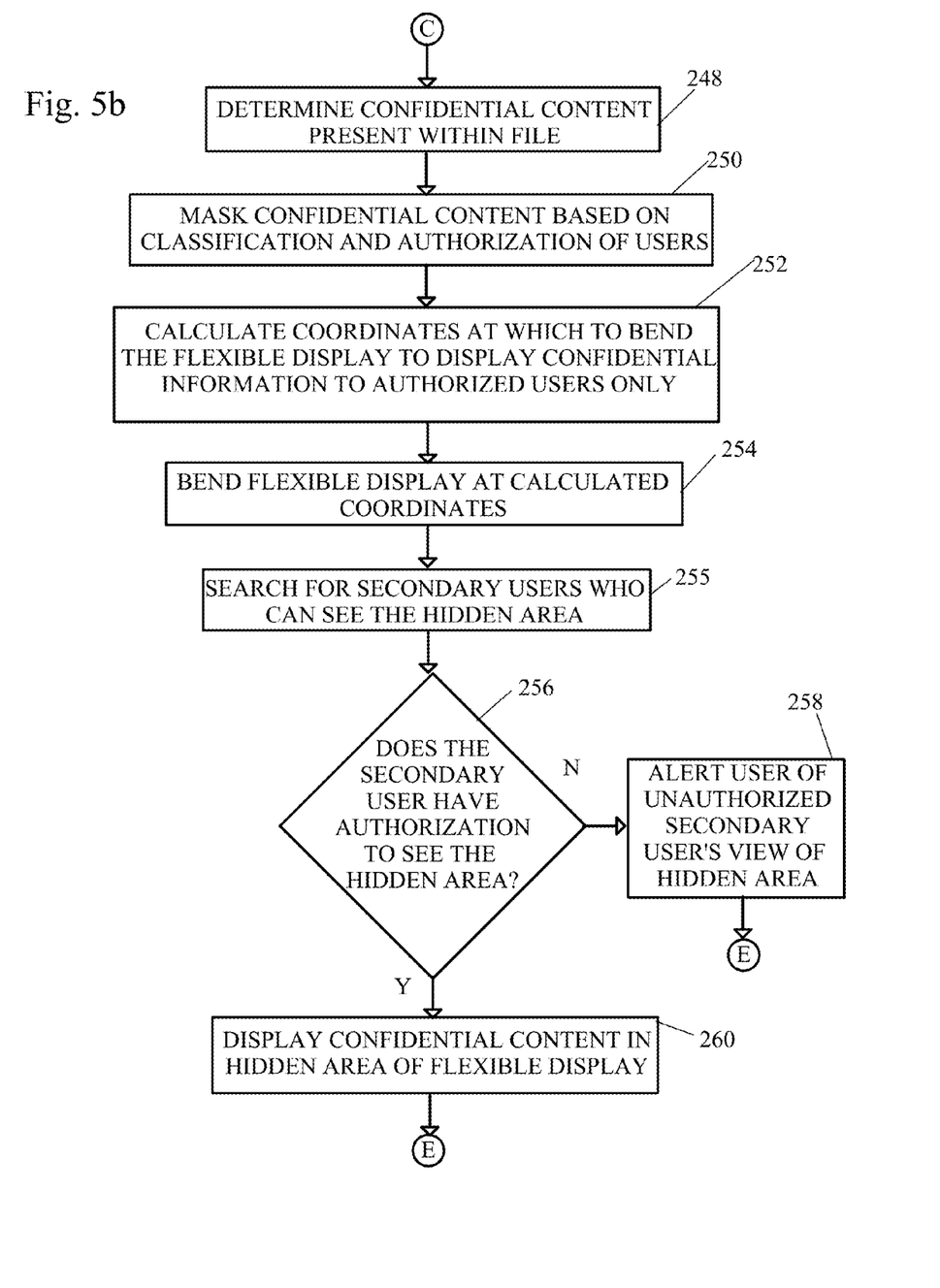

It should be noted that the steps of FIG. 4 take place at some time prior to the steps of FIGS. 5a-5b.

FIGS. 5a-5b show a flowchart of a method of displaying confidential content on a flexible display for authorized users.

In a first step, the flexible display device receives a user login and a facial picture or image of the user (step 230), for example through the confidential content program 67. The facial picture is received through the camera of the flexible display device.

If the user login and facial image of the user is not verified (step 232), the method ends.

If the user login and facial image of the user is verified (step 232), the flexible display device receives a request from the user to open an electronic file containing confidential content (step 234), for example through the confidential content program 67.

If the user does not have permission to view the requested file (or, in some embodiments, any or all of the confidential content within the file) (step 236), determined through the confidential content program 67, the confidential content program 67 sends the user a notification denying the request to open the file (step 238) and the method returns to step 234 of receiving a request to open a file.

The confidential content program 67 then searches for the presence of, viewing direction and distance of secondary users (a user other than the user who has logged into the system) within a distance range of the display device (step 240) through a camera of the flexible display device.

If there is a secondary user within the distance range of the display (step 242), the secondary user's facial image is compared with the repository to determine if the secondary user is authorized or has rights to view the confidential content (step 244). If there is no secondary user, the method proceeds to step 246.

If the secondary user is authorized (and, in some embodiments, if the user is also authorized) to view the confidential content, the flexible display device displays the file with the confidential content unmasked to the user and secondary authorized user (step 246) and the method returns to step 240.

If the secondary user (or, in some embodiments, the user) is not authorized to view the confidential content (step 244), the locations of the confidential content within the file is determined (step 248), for example through the confidential content program 67.

The determined confidential content within the file is masked based on the confidential content classification of the content (and, in some embodiments, the confidential content authorization of the user and/or secondary user) (step 250), for example by the confidential content program 67. The masking may be different colors or hatching or any other means for preventing readability of the confidential content by users who can see the exposed portion or display portion 116 of the flexible display.

In some embodiments, what contents are masked can be determined based on a comparison of the security level of any particular piece of content with the highest security level which either the user or any secondary user has. In this embodiment, for example, if the user and all secondary users are authorized for "confidential" material, but not "top secret" or "secret", the confidential material will be displayed, but anything rated secret or top secret would be masked. Therefore, for multiple users viewing the display of the flexible display device the "lowest" or highest security level in common for all of the users viewing the display of the flexible display device and the confidential content will be displayed in the hidden area of the flexible display device.

The coordinates at which to bend the flexible display device to display the confidential content to authorized users only is calculated (step 252), for example by the confidential content program 67. The calculation analyzes the facial direction of the unauthorized users to calculate their view angle and provides a direction in which the flexible display is recommended for bending to allow a portion of the display to be hidden from the unauthorized users.

The amount in which the flexible display device is recommended for bending is also based on the degree of confidentiality as determined in step 248. The greater the amount of confidential content present within the file, the larger the area needed for the confidential content and the larger the bend. Furthermore, the greater the degree of confidentiality or the higher the level of confidentiality, the increase in the amount of bending recommended.

The flexible display device is bent at the calculated coordinates (step 254), for example by the bending program 66. The operating system framework application programming interface (API) of the flexible display device through the bending program 66 bends the flexible display in specific direction to protect view of confidential content. Alternatively, the user can bend the flexible display device as indicated along the calculated coordinates.

Secondary users are searched for who can see the hidden area from the bending of the flexible display device (step 255), for example with the camera of the flexible display device through the confidential content program 67.

If the secondary user does not have authorization to see the hidden area with the confidential content, (step 256), for example as detected through facial recognition of the secondary user through the confidential content program 67 and the camera of the flexible display device, an alert is sent to the user regarding the unauthorized secondary user view of the confidential content in the hidden area (step 258) and the method returns to step 240.

If the secondary user does not have authorization to see the hidden area with the confidential content, (step 256), for example as detected through facial recognition of the secondary user through the confidential content program 67 and the camera of the flexible display device, the file is opened with the confidential content masked on the display of the flexible display device and the legend relating to the confidential content is displayed in the hidden area or confidentiality pane of the flexible display device (step 260) and the method returns to step 240.

In addition, the confidential content may be displayed in the confidentiality pane or hidden area in a smaller font than present in the viewing portion of the display.

FIG. 6 illustrates internal and external components of device computer 52 and server computer 54 in which illustrative embodiments may be implemented. In FIG. 6, device computer 52 and server computer 54 include respective sets of internal components 800*a*, 800*b* and external components 900*a*, 900*b*. Each of the sets of internal components 800*a*, 800*b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, bending program 66, and confidential content program 67 is stored on one or more of the computer-readable tangible storage devices 830 for execution by one or more of the processors 820 via one or more of the RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a*, 800*b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. Bending program 66 and confidential content program 67 can be stored on one or more of the portable computer-readable tangible storage devices 936, read via R/W drive or interface 832 and loaded into hard drive 830.

Each set of internal components 800*a*, 800*b* also includes a network adapter or interface 836 such as a TCP/IP adapter card. Bending program 66 and confidential content program 67 can be downloaded to the device computer 52 and server computer 54 from an external computer via a network (for example, the Internet, a local area network or other, wide area network) and network adapter or interface 836. From the network adapter or interface 836, bending program 66 and confidential content program 67 are loaded into hard drive 830. The network may comprise copper wires, optical fibers, wireless transmission, routers, firewalls, switches, gateway computers and/or edge servers.

Each of the sets of external components 900*a*, 900*b* includes a computer display monitor 920, a keyboard 930, and a computer mouse 934. Each of the sets of internal components 800*a*, 800*b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Bending program 66 and confidential content program 67 can be written in various programming languages including low-level, high-level, object-oriented or non object-oriented languages. Alternatively, the functions of a bending program 66 and a confidential content program 67 can be implemented in whole or in part by computer circuits and other hardware (not shown).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method of displaying confidential content on a flexible display of a flexible display device having a plurality of sensors for sensing bending of the flexible display device, at least one camera, and a computer coupled to the plurality of sensors and the at least one camera, the method comprising the steps of:
   the computer receiving content for display on the flexible display device for a user comprising confidential content and non-confidential content;
   the computer determining that at least one secondary user is present by searching through the at least one camera of the flexible display device for the viewing direction of the secondary user and unauthorized to view at least a portion of the confidential content;
   the computer determining locations of the confidential content present within the file;
   the computer masking the confidential content locations based on a classification of the confidential content and authorization of the user to the user and the at least one secondary user on the flexible display of the flexible display device;
   the computer calculating coordinates at which to bend the flexible display device to create a hidden area to display confidential content to the user;
   the computer directing a bend of the flexible display at the coordinates;
   after the flexible display is bent, the computer determining an actual area hidden by the bending of the flexible display; and
   the computer displaying a legend corresponding to masked confidential information displayed to the user within the hidden area of the bent flexible display device out of view of the at least one secondary user.

2. The method of claim 1, further comprising the step of: the computer searching for other secondary users not authorized to see the confidential content with a view of the hidden area of the flexible display device; and if at least one secondary user who is not authorized can view the hidden area with the confidential content, the computer removing the display of confidential content in the hidden area and calculating coordinates at which to bend the flexible display device to create a hidden area to display confidential content to the user and not the secondary user who is not authorized.

3. The method of claim 2, further comprising the step of alerting the user of an unauthorized secondary user's view of the hidden area.

4. The method of claim 1, wherein the computer of the flexible display device bends the display at the coordinates.

5. The method of claim 1, further comprising the step of displaying the file with confidential content unmasked if at least one secondary user is present and is authorized to view at least a portion of the confidential content of the file.

6. The method of claim 1, wherein the masking is shading of the confidential content to completely obscure the content.

7. The method of claim 1, further comprising the steps of:
   the computer receiving registration information from the user;
   the computer receiving access controls for the user and other authorized secondary users based on confidential content classification;
   the computer receiving a facial picture of a user and other authorized secondary users for storage in a repository for facial recognition comparison; and
   the computer receiving user preferences regarding a tolerance range.

8. The method of claim 1, wherein the computer recalculates the coordinates at which to bend the display to increase the hidden area based on degree of confidentiality of the content and amount of confidential content being displayed in the legend.

9. A computer program product for displaying confidential content on a flexible display of a flexible display device having a plurality of sensors for sensing bending of the flexible display device, at least one camera, and a computer comprising at least one processor, one or more memories, one or more computer readable storage media, coupled to the plurality of sensors and the at least one camera, the computer program product comprising a computer readable storage medium having program instructions embodied therewith, the program instructions executable by the computer to perform a method comprising:
   receiving, by the computer, content for display on the flexible display device for a user comprising confidential content and non-confidential content;
   determining, by the computer, that at least one secondary user is present by searching through the at least one camera of the flexible display device for the viewing direction of the secondary user and unauthorized to view at least a portion of the confidential content;
   determining, by the computer, locations of the confidential content present within the file;
   masking, by the computer, the confidential content locations based on a classification of the confidential content and authorization of the user to the user and the at least one secondary user on the flexible display of the flexible display device;
   calculating, by the computer, coordinates at which to bend the flexible display device to create a hidden area to display confidential content to the user;
   directing, by the computer, a bend of the flexible display at the coordinates;
   after the flexible display is bent, determining, by the computer, an actual area hidden by the bending of the flexible display; and
   displaying, by the computer, a legend corresponding to masked confidential information displayed to the user and the at least one secondary user within the hidden area of the bent flexible display device out of view of the at least one secondary user.

10. The computer program product of claim 9, further comprising program instructions of searching, by the computer for other secondary users not authorized to see the confidential content with a view of the hidden area of the flexible display device; and if at least one secondary user who is not authorized can view the hidden area with the confidential content, removing, by the computer the display of confidential content in the hidden area and calculating coordinates at which to bend the flexible display device to create a hidden area to display confidential content to the user and not the secondary user who is not authorized.

11. The computer program product of claim 9, further comprising the program instructions of alerting the user of an unauthorized secondary user's view of the hidden area.

12. The computer program product of claim 9, further comprising the program instructions of displaying the file with confidential content unmasked if at least one secondary user is present and is authorized to view at least a portion of the confidential content of the file.

13. The computer program product of claim 9, wherein the masking is shading of the confidential content to completely obscure the content.

14. The computer program product of claim 9, wherein the hidden area created to display confidential content to the user is related to the level of classification of the confidential content.

15. The computer program product of claim 9, further comprising the program instructions of:
receiving, by the computer, registration information from the user;
receiving, by the computer, access controls for the user and other authorized secondary users based on confidential content classification;
receiving, by the computer, a facial picture of a user and other authorized secondary users for storage in a repository for facial recognition comparison; and
receiving, by the computer, user preferences regarding a tolerance range.

16. A method of displaying confidential content on a flexible display of a flexible display device having a plurality of sensors for sensing bend stress and bending of the flexible display device, at least one camera having a field of view relative to the device, and a computer coupled to the plurality of sensors and the at least one camera, the method comprising the steps of:
the computer receiving content for display on the flexible display device for a first user;
the computer determining by the at least one camera a second user present in the field of view of the device;
if the content for display contains confidential content and a second user is present within the field of view of the device who is unauthorized to view the confidential content, the computer performing the steps of:
calculating coordinates at which to bend the flexible display device to create a hidden area to display confidential content to the user;
directing a bend of the display at the coordinates; and
formatting for display, the received content into a non-confidential display portion with confidential content masked and a confidential display portion in the hidden area.

17. The method of claim 16, wherein if content for display contains non-confidential content, further comprising the steps of: formatting for display, the received content into a non-confidential display portion of the flexible display device.

18. The method of claim 16, further comprising the step of: the computer searching for other secondary users not authorized to see the confidential content with a view of the confidential display portion of the flexible display device; and if at least one secondary user who is not authorized can view the confidential display portion, the computer removing the display of confidential content in the confidential display portion and calculating coordinates at which to bend the flexible display device to create a confidential display portion to display confidential content to the user and not the secondary user who is not authorized.

19. The method of claim 16, wherein the flexible display is bent by the user.

20. The method of claim 16, wherein the masking is shading of the confidential content to completely obscure the content.

* * * * *